April 30, 1940.   W. G. CALKINS ET AL   2,198,654
SPLINED COUPLING
Filed Dec. 23, 1938

INVENTOR
CARL BREER AND
BY WILLIAM G. CALKINS.
Harness, Lind, Watel & Harris
ATTORNEYS.

Patented Apr. 30, 1940

2,198,654

UNITED STATES PATENT OFFICE 2,198,654

SPLINED COUPLING

William G. Calkins, Detroit, and Carl Breer, Grosse Pointe Park, Mich., assignors to Chrysler Corporation, Highland Park, Mich., a corporation of Delaware Application December 23, 1938, Serial No. 247,350

6 Claims. (Cl. 64—23)

This invention relates to an improved splined joint.

More particularly, the invention relates to improvements in joints of this character by which shaft sections are nonrotatably but slidably connected together.

One of the main objects of the invention is the provision in a joint of this kind of porous metal splined portions having a substantial self-contained lubricant content.

Another object of the invention is the provision of lubricant-filled porous metal surface portions on all slidably engaged parts of a splined joint of this character.

A further object of the invention is the provision on the inner and outer telescoping joint members of splines having porous metal lubricant-containing portions slidably engaged with solid metal splined portions respectively.

A still further object of the invention is the provision of splines on one of the relatively shiftable parts of a joint of this kind which have solid metal sections engaged with a portion of the solid metal splines of the other member for transmitting torque from one part to the other part and porous lubricant-containing metal sections engaged with other portions of the solid metal splines for supplying lubricant to the slidably engaged surfaces of the relative parts of the joint.

Illustrative embodiments of the invention are shown in the accompanying drawing in which.

Figure 1:
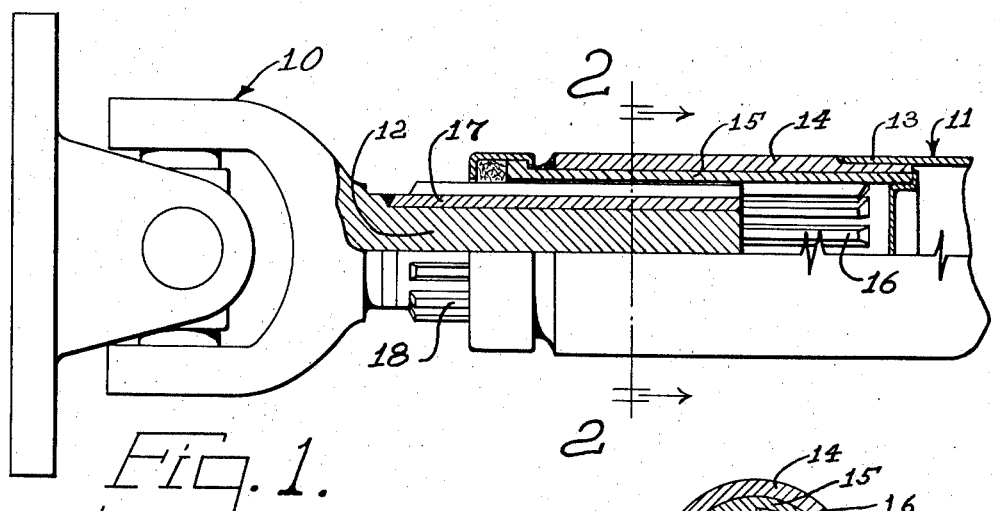
Fig. 1 is a side elevational view, partly in section, of a splined joint embodying the invention.
Figure 2:
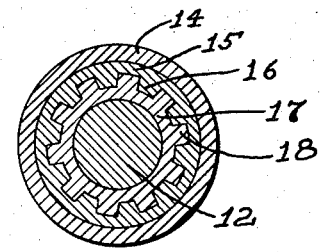
Fig. 2 is a vertical sectional view taken on the line 2—2 of Fig. 1.

In the form of the invention shown in Figs. 1 and 2, there is illustrated a splined joint between a universal coupling, generally designated by the numeral 10, and a propeller shaft generally designated by the numeral 11. The universal coupling 10 comprises a solid metal shank portion 12 which serves as the inner telescoping joint member and the propeller shaft 11 comprises a metal tube 13 on which is fixed, preferably by welding, an outer telescoping joint member 14. Fitted in the outer joint member 14 is a sleeve 15 comprising porous bearing metal preferably formed by compressing a charge of metal powders into a cylindrical briquette and thereafter sintering the briquette. The sleeve 15 is preferably integrally fixed to the internal surface of the outer joint member 14. This may be accomplished by placing the compressed briquette of which the sleeve 15 is formed into the outer member 14 before sintering and then simultaneously sintering and bonding the sleeve 15 to the inner surface of the joint member 14 by subjecting the assembly to sintering temperatures in a non-oxidizing or reducing atmosphere. If desired, however, the briquette of which the sleeve 15 is formed may be sintered before insertion into the outer joint member 14 and the bonding operation may be separately conducted by thereafter subjecting the assembly to suitably high temperatures in a non-oxidizing or reducing atmosphere. After the sleeve 15 has been sintered and bonded to the internal surface of the outer joint member 14, splines 16 are broached or otherwise suitably formed in the interior of the sleeve. The height of the splines 16 in the form of the invention illustrated in Figs. 1 and 2 is less than the total thickness of the sleeve.

Fitted on the exterior of the inner joint member 12 is a sleeve 17 which also comprises porous bearing metal formed in the same manner as the sleeve 15 by compression and sintering of the powdered metal. The sleeve 17 may be sintered before assembly on the joint member 12 and thereafter bonded to the exterior surface of the latter by heating it to a suitably high temperature in a non-oxidizing or reducing atmosphere, or the briquette from which the sleeve 17 is formed may be simultaneously sintered and bonded to the joint member 12 as set forth in connection with the description of the attachment of the sleeve 15 to the joint member 14. Formed, by milling or other suitable operations, on the exterior of the sleeve 17 are a plurality of splines 18 which cooperate with the splines 16 in holding the relatively shiftable parts of the joint against relative rotative movement. After the sleeves 15 and 17 have been bonded to the respective parts of the joints, their pores are filled with lubricant, preferably by heating the parts and immersing them in an oil bath. In this form of the invention all slidably engaged surfaces of the joint comprise porous bearing metal having a substantial self-contained lubricant content which in many installations is adapted to serve throughout the life of the structure.

Figure 3:
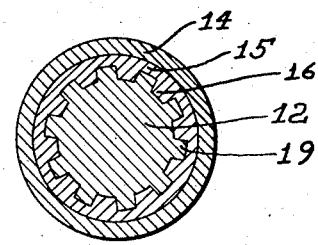
Fig. 3 is a vertical sectional view, similar to Fig. 2, of a joint embodying a modified form of the invention.

In the form of the invention illustrated in Fig. 3, the splined joint comprises an outer joint member 14 and a porous bearing metal sleeve 15 substantially identical to the corresponding parts of the structure shown in Figs. 1 and 2. The inner joint member 12, however, has splines 19 formed on its exterior which consist of the same metal as the body portion of the joint member 12. In this form of the invention the solid metal splines 19 of the inner joint member are in sliding contact with the lubricant-filled porous bearing metal of the sleeve 15. If desired, a sleeve 17 may be provided on the inner joint member 12, as illustrated in Fig. 2, and the splines of the outer joint member may be formed directly therein and comprise the same material. In either case, the slidably engaged surfaces of the joint are supplied with lubricant which is self contained by the structure.

Figure 4:
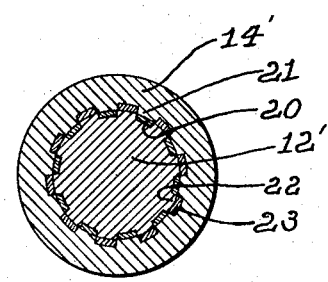
Fig. 4 is a vertical sectional view, similar to Figs. 2 and 3, illustrating a splined joint embodying another form of the invention.

In the form of the invention illustrated in Fig. 4, an outer joint member 14', similar to and corresponding with the joint member 14 illustrated in Figs. 1 and 2, is provided with an internal sleeve comprising lubricant-filled porous bearing metal in the same manner as the sleeve 15 is provided in and bonded to the outer joint member 14 of the form shown in Figs. 1 and 2. The porous bearing metal sleeve employed in forming the joint illustrated in Fig. 4, is, however, of substantially less thickness than the sleeve 15 and after it has been bonded to the internal surfaces of the outer joint member 14, splines are broached in the interior of the latter by a broaching operation during which a cut is made completely through the porous bearing metal sleeve and into the body of the outer joint member 14', thus leaving a layer 20 of lubricant-filled porous bearing metal on the outer extremity of each spline 21 formed by the broaching operation.

The inner joint member 12' of the form of the invention illustrated in Fig. 4 is provided on its exterior with a lubricant-filled porous bearing metal sleeve in the same manner as the sleeve 17 is provided on and bonded to the inner joint member 12 of the form of the invention shown in Figs. 1 and 2. The porous metal sleeve which is bonded to the inner joint member 12' is, however, of less thickness than the sleeve 17 and is preferably predetermined in thickness to be substantially equal to the difference between the thickness of the layer of porous bearing metal 20 on the splines of the outer joint member 14 and the entire height of the splines. After the inner joint member 12' has been provided with a relatively thin sleeve of porous metal splines 22 are formed on the exterior thereof by a milling or other suitable operation during which cuts are made through the porous metal sleeve and into the body of the metal of which the inner joint member 12' is formed, thereby providing on the outer extremities of the splines 22 layers 23 of porous bearing metal which have a substantial self-contained lubricant content. The thicknesses of the layers 20 and 23 of porous bearing metal are preferably so predetermined with respect to the depths of the splines as to provide porous bearing metal surfaces on the splines of each member for contacting with the metal surfaces of the other member respectively which comprise the solid metal of the joint parts. However, if it is desired to directly engage together the solid metal sections of the splines of the respective parts of the joint, then the layers 20 and 23 of porous bearing metal may be predetermined in thickness so that their combined thickness is less than the depth of one spline.

Figure 5:
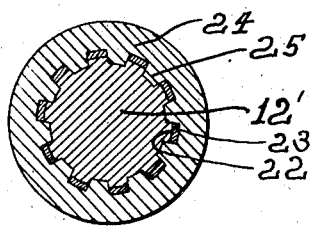
Fig. 5 is a vertical sectional view similar to Figs. 2, 3 and 4 but illustrating a splined joint embodying a further modification of the invention.

In Fig. 5 is illustrated a splined joint similar to that shown in Fig. 4 in which is provided an inner joint member 12' having splines 22 on its exterior provided with porous metal layers 23. The outer joint part 24 has splines 25 comprising the metal of the joint part formed by broaching directly into the body of the outer joint part. In this form of the invention, portions of the splines of both joint parts comprising the metal thereof are disposed in registration with each other for the purpose of transferring torque directly from one joint part to the other. The lubricant-filled porous metal layers 23 on the splines of the inner part serve as lubricant reservoirs and wiping wicks by which films of lubricant are supplied to the engaged surfaces of the splines.

The porous bearing metal employed in any of the foregoing embodiments of the invention may be formed by mixing together 90 parts by weight of powdered copper, 10 parts by weight of powdered tin, ¾ part by weight of stearic acid and ½ part by weight of graphite or Zonolite. Zonolite comprises powdered exfoliated vermiculite, a mica-like composition. After these ingredients have been thoroughly mixed together, they may be compressed in a suitable die to the desired sleeve shape and then sintered at from 1500° F. to 1550° F. The sintering operation, as set forth above, may be conducted simultaneously with the bonding operation by properly arranging the briquetted sleeve on the joint part. The briquetting operation may be conducted in a die so formed as to directly provide the splines 16 during the briquetting operation. The powdered metal charge may be formed to a sheet-like shape and wrapped or otherwise suitably brought to cylindrical form.

Other suitable compositions from which porous bearing metal may be formed comprise 25 parts by weight of copper, 74 parts by weight of iron, 1 part by weight of stearic acid and ½ part by weight of graphite or Zonolite. The sintering of this composition should be conducted at substantially from 1900° F. to 2200° F.

The assurance of ample lubricant on the surfaces of the splines of a joint of this type permits the use thereof in many applications where the splines are under extreme torque loads, pressure upon the lubricant-filled porous bearing metal causing the lubricant to be exuded when lubricant is required. It is not necessary to rely upon the porous bearing metal solely to transmit torque from one member of a splined joint to the other for, as set forth, the splines may include registering portions comprising the solid metal of the joint parts. The presence of lubricant-filled porous bearing metal in close proximity to the bearing surfaces of the splines assures proper lubrication thereof.

Although but several specific embodiments of the invention are herein shown and described, it will be understood that various changes in the sequence of operations, steps and materials employed may be made without departing from the spirit of the invention.

What is claimed is:

1. A device comprising relatively movable parts having slidably engaged splines thereon, a portion of the splines of at least one of said parts comprising a compressed and sintered powdered metal porous structure having a substantial self-contained lubricant content.

2. A joint comprising relatively movable telescoping metal parts, and engageable splines on the adjacent inner and outer sides of said parts respectively, one of each pair of engageable splines comprising a portion consisting of the metal of one of said parts and a layer of compressed and sintered porous bearing metal having a substantial self-contained lubricant content.

3. A joint comprising relatively movable telescoping metal parts, engageable splines on adjacent inner and outer sides of said parts respectively, one of each pair of engageable splines having a layer of porous bearing metal comprising a compressed and sintered powdered metal structure engageable with a portion of the other spline comprising the metal of said parts respectively, said porous bearing metal having a substantial self-contained lubricant content, and the splines of each engageable pair thereof having engageable portions comprising the metal of said parts.

4. A device comprising relatively movable metal parts, engageable spline-like members on adjacent sides of said parts, one of each pair of said engageable members having a layer of porous bearing metal comprising a compressed and sintered powdered metal structure engageable with a portion of the other member comprising the metal of said parts respectively, and the spline-like members of each engageable pair thereof having engageable portions comprising the metal of said parts, said porous bearing metal having a substantial self-contained lubricant content and being integrally bonded to said metal parts.

5. A joint comprising relatively movable telescoping metal parts, splines on one of said parts, and a sleeve having splines thereon cooperating with said first mentioned splines and fixed to the other part, said sleeve comprising porous bearing metal having a compressed and sintered powdered metal body portion and having a substantial self-contained lubricant content.

6. A joint comprising relatively movable telescoping inner and outer metal parts, a pair of sleeves having cooperating splines thereon, one of said sleeves being integrally bonded to the exterior of said inner part and the other integrally bonded to the interior of said outer part, said sleeves comprising porous bearing metal having a compressed and sintered body portion and a substantial self-contained lubricant content.

CARL BREER.
WILLIAM G. CALKINS.